United States Patent [19]
Furuno et al.

[11] Patent Number: 5,317,449
[45] Date of Patent: May 31, 1994

[54] PROJECTION TELEVISION SET

[75] Inventors: Takashi Furuno; Toshiya Wakasa; Jun Iizuka; Kanehiro Hagiwara; Mitsuyoshi Mitake, all of Tokyo, Japan

[73] Assignee: Pioneer Electronic Corporation, Tokyo, Japan

[21] Appl. No.: 50,549

[22] Filed: Apr. 20, 1993

[30] Foreign Application Priority Data

Apr. 23, 1992 [JP] Japan .................................. 4-104802
Apr. 23, 1992 [JP] Japan .................................. 4-104803

[51] Int. Cl.$^5$ .................................................. G03B 21/56
[52] U.S. Cl. .................................. 359/443; 359/449; 359/451
[58] Field of Search ........................ 359/443, 449, 451

[56] References Cited
U.S. PATENT DOCUMENTS

| | | | |
|---|---|---|---|
| 3,992,841 | 11/1976 | Ward, Jr. ............................ | 359/443 |
| 4,318,589 | 3/1982 | Brown et al. ...................... | 359/451 |
| 4,668,046 | 5/1987 | Yatabe et al. ...................... | 359/443 |
| 4,984,871 | 1/1991 | Martinez ............................ | 359/443 |
| 5,011,263 | 4/1991 | Hopper .............................. | 359/451 |
| 5,011,277 | 4/1991 | Ogino et al. ...................... | 359/451 |
| 5,103,339 | 4/1992 | Broome .............................. | 359/443 |
| 5,206,760 | 4/1993 | Nakashima et al. ............... | 359/443 X |

Primary Examiner—Richard A. Wintercorn
Attorney, Agent, or Firm—Kane, Dalsimer, Sullivan, Kurucz, Levy, Eisele and Richard

[57] ABSTRACT

A projection television set in which a seamless image may be obtained on a screen. A screen plate of a screen assembly is held under a suspended state by a frame in a state wherein the left and right parts are centered in the frame. A cruciform light-shielding frame is mounted on the frame. A light-shielding plate is swingably mounted on a horizontal light-shielding frame of the frame. The position of the light shielding plate is adjusted in response to the vertical movement of a horizontal joint. Also, the horizontal joint line adjusting mechanism is provided independently of a centering mechanism for a vertical joint line.

15 Claims, 12 Drawing Sheets

PROJECTION TELEVISION SET

BACKGROUND OF THE INVENTION

The present invention relates to a projection television set having a large size screen formed by joining a plurality of Fresnel lenses. Also, the present invention relates to a projection television set having a seamless screen which is to be projected from a plurality of projectors.

In general, a projection television set is provided within a body casing with a CRT unit, an LCD unit and a projector including a projection lens. The projector is provided with a single RGB unit. A screen assembled by a Fresnel lens and a lenticular sheet is provided in a front face of the projector.

Japanese Patent Application Laid-Open No. Hei-3-73938 discloses a projection television set in which four unity Fresnel lenses are joined together. A reinforcement sheet is used to support the Fresnel lenses with centers of the four Fresnel lenses being fixedly aligned with the reinforcement sheet.

Thus, it is unnecessary to perform a centering operation of the screen center in the former projection television set where a single Fresnel lens corresponds to a single RGB unit. In the latter case, the centering operation of the laterally arranged Fresnel lenses is performed through the reinforcement sheet. Therefore, the reinforcement sheet is needed, resulting in the increased number of the components and in degradation in brightness. In such a case, if the right and left centers would not be aligned well, a seam line of the joint line of the Fresnel lenses and the lenticular sheets would appear on the image, so that the quality of the image would be worse.

Figure 13:
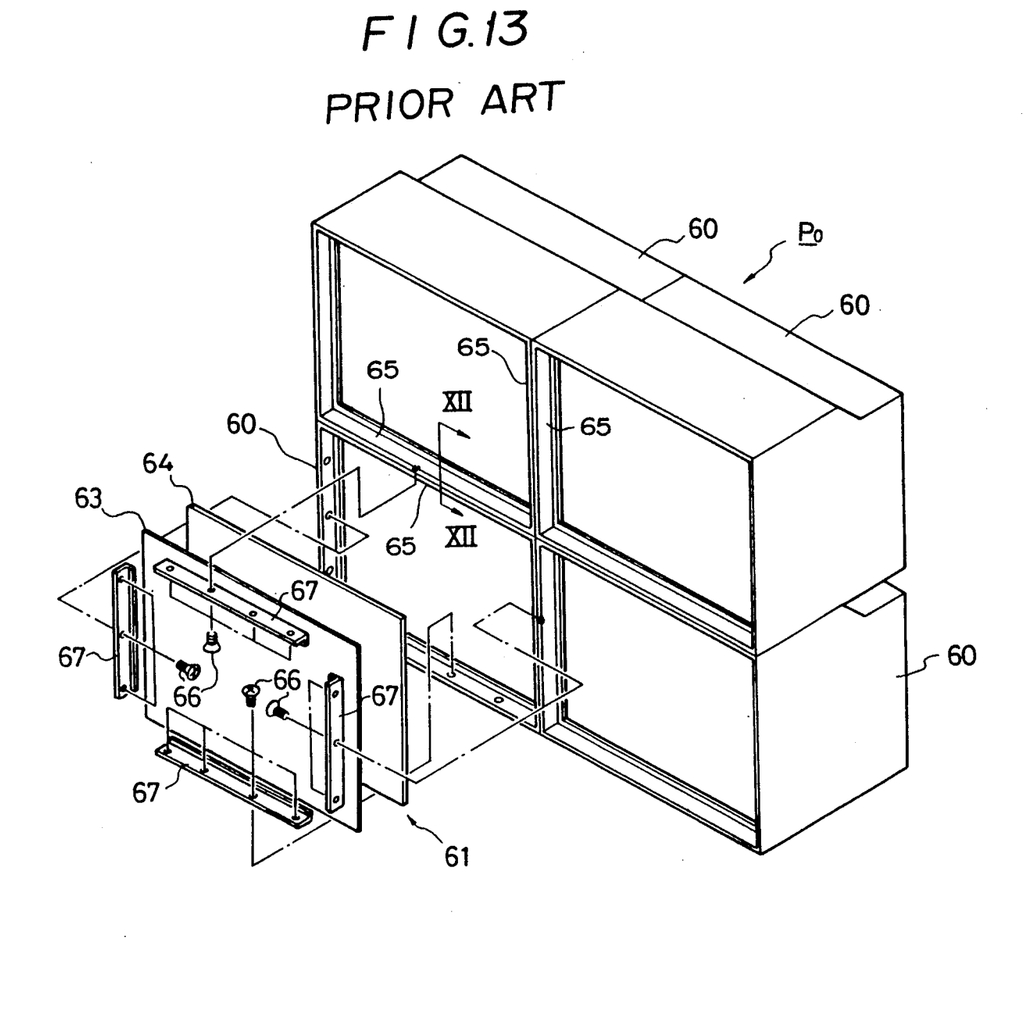
FIG. 13 is a perspective view showing a conventional projection television set.
Figure 14:
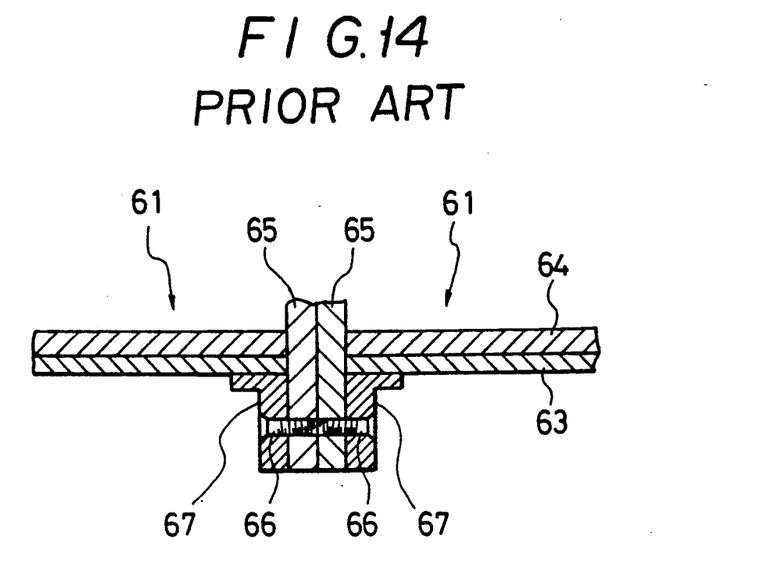
FIG. 14 is a cross-sectional view taken along the line XII—XII of FIG. 13.

On the other hand, a conventional multi-unit projection television set $P_o$ has a structure as shown in FIG. 13 (Japanese Patent Application No. 2-402519). For instance, four projection television units 60 are piled up and down and right and left, so that screens 61, 61, . . . , 61 are formed on the front faces of the four projection television units 60. These screens are each composed of a lenticular sheet 63 and a Fresnel lens 64 which are overlapped on each other. Joints of the adjacent screens 61 are carried out as shown in FIG. 14. Namely, frames 65, 65 are mounted at edges of the overlapped Fresnel lenses 64 and the lenticular sheets 63 and are bonded together. Further, panel plates 67 are mounted on the frames 65. The panel plate 67 and the frames 65 are fixed together by screws 66 to thereby join the adjacent screens 61.

Figure 15:
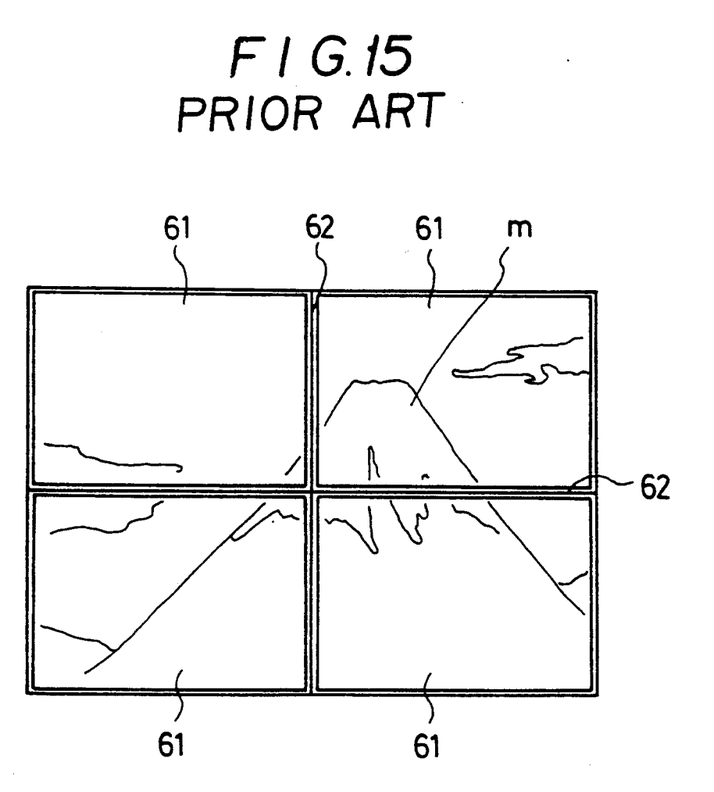
FIG. 15 is a front view showing the conventional screen.

However, the above-described joint structure for screens suffers from a problem such that rays of light projected from adjacent projectors such as CRT units, LCD units and the like are shielded or interrupted by the panel plates 67 and will not reach the joint portions of the frames 65, as a result of which joint lines 62 are formed as shown in FIG. 15 and part of an image m is omitted.

SUMMARY OF THE INVENTION

In view of the above, a primary object of the invention is to provide a projection television set in which centers of right and left parts of a screen corresponding to frames of the screen assembly may readily be centered.

Another object of the invention is to provide a projection television set provided with a seamless screen to avoid the omission of the image.

In a projection television set provided at a front face of a body casing with a screen assembly in which at least two right-and-left divided Fresnel lenses are joined to each other, the screen assembly including a frame for defining periphery of a screen composed of the Fresnel lenses and a lenticular sheet, a screen support member mounted along an upper edge of the screen and a screen suspension member engaged with the screen support member for supporting the screen to the frame, wherein a first center engagement section is formed at a position of the screen support member corresponding to a joint line for the right and left parts of the screen; a second center engagement section of the screen suspension member is engaged with the first center engagement section; and a first centering section of the screen support member formed corresponding to the second center engagement section of the screen suspension member is in alignment with a second centering section formed in an upper central side of the frame.

A plurality of Fresnel lenses are joined together. A screen support member is mounted on and along an upper side of a screen by overlapping a lenticular sheet onto the joined Fresnel lens. A screen suspension member is coupled with the screen support member. The screen suspension member is mounted on a frame. A first center engagement section of the screen support member is in alignment with a second center engagement section of the screen suspension member whereby the screen support member and the screen suspension member are aligned with each other. Further, a first centering section of the screen suspension member and a second centering section of the frame of the screen assembly are engaged with each other whereby the right and left parts of the screen are suspend corresponding to the center of the frame.

According to the invention, there is provided a projection television set characterized in that a screen assembly is provided on a front face of a body casing, joint screen of the screen assembly is supported under a suspended condition to a frame of the screen assembly while centering a joint of a right screen and a left screen, a cruciform light-shielding frame is mounted on the screen, and a light-shielding plate is adjustably mounted on at least a horizontal light-shielding frame of the light-shielding frame so that the light-shielding plate is in alignment with the joint of the screen.

The joint screen plate of the screen assembly is supported to the frame of the screen assembly under the suspended condition while centering the joint line of the right and left screens with a center of an upper part of the frame. A cruciform light-shielding frame is mounted on the frame. A light shielding plate of a vertical frame of the light-shielding frame is fixed along the joint line of the right and left screens. The light-shielding plate is adjustably mounted on the horizontal light-shielding frame in alignment with a horizontal joint line of the screen plate. Even if the joint of the upper and lower sections of the screen would be displaced from a predetermined position due to changes in temperature, humidity or machining precision, the position of the light-shielding plate may be adjusted in correspondence with the displacement. With such a light-shielding plate, it is possible to obtain a uniform and seamless image while preventing the overlap of the projecting light rays from the respective CRT units.

According to one aspect of the invention there is provided a projection television set comprising: a body casing having a front face; and a screen assembly provided at the front face of the body casing, the screen assembly including a screen composed of at least two right-and-left divided Fresnel lenses joined together and a lenticular sheet, a frame for defining a periphery of the screen, a screen support member mounted along an upper edge of the screen, and a screen suspension member engaged with the screen support member for supporting the screen to the frame. A first center engagement section is formed at a position of the screen support member corresponding to a joint line for right and left parts of the screen; a second center engagement section of the screen suspension member is engaged with the first center engagement section of the screen support member; and a first centering section of the screen support member formed corresponding to the second center engagement section of the screen suspension member is in alignment with a second centering section formed in an upper central side of the frame.

The first center engagement section includes a recess formed in the screen support member. The second center engagement section includes a projection formed on the screen suspension member. The first centering section includes a screw hole formed in the screen suspension member. The second centering section includes a screw hole formed in the frame.

According to another aspect of the invention, there is provided a projection television set comprising: a body casing having a front face; and a screen assembly provided at the front face of the body casing, the screen assembly including a joint screen having at least a vertical joint line, a frame for defining a periphery of the joint screen, a cruciform light-shielding frame mounted on the screen, the light-shielding frame having a horizontal light-shielding frame member having a light-shielding plate, and a light-shielding plate adjusting means for adjusting a position of the light-shielding plate; wherein the joint screen of the screen assembly is supported under a suspended condition to the frame of the screen assembly while centering the vertical joint line with a center of the frame; and the light-shielding plate is adjustably mounted on at least the horizontal light-shielding frame of the light-shielding frame so that the light-shielding plate is in alignment with the joint line of the screen.

The light shielding plate adjusting means includes a pair of holding members for rotatably holding the light-shielding plate through a rotary bar which is manually adjustable.

Also, the light-shielding plate adjusting means includes a pair of holding members for rotatably holding the light-shielding plate and the screen assembly further includes a support plate attached to the screen, the light-shielding plate being coupled with the support plate whereby vertical expansion may be absorbed by the light-shielding plate adjusting means.

According to a third aspect of the invention, there is provided a projection television set comprising: a body casing having a front face; and a screen assembly provided at the front face of the body casing, the screen assembly including a screen composed of at least two right-and-left divided Fresnel lenses joined together and a lenticular sheet, a frame for defining a periphery of the screen, a screen support member mounted along an upper edge of the screen, a screen suspension member engaged with the screen support member for supporting the screen to the frame, a cruciform light-shielding frame mounted on the screen, the light-shielding frame having a horizontal light-shielding frame member having a light-shielding plate, and a light-shielding plate adjusting means for adjusting a vertical position of the light-shielding plate independently of its horizontal position; wherein a first center engagement section is formed at a position of the screen support member corresponding to a vertical joint line for right and left parts of the screen; a second center engagement section of the screen suspension member is engaged with the first center engagement section of the screen support member; a first centering section of the screen support member formed corresponding to the second center engagement section of the screen suspension member is in alignment with a second centering section formed in an upper central side of the frame; and the light-shielding plate is adjustably mounted on at least the horizontal light-shielding frame of the light-shielding frame so that the light-shielding plate is in alignment with the horizontal joint line of the screen.

DESCRIPTION OF THE PREFERRED EMBODIMENTS

One embodiment of the invention will now be described.

Figure 1:
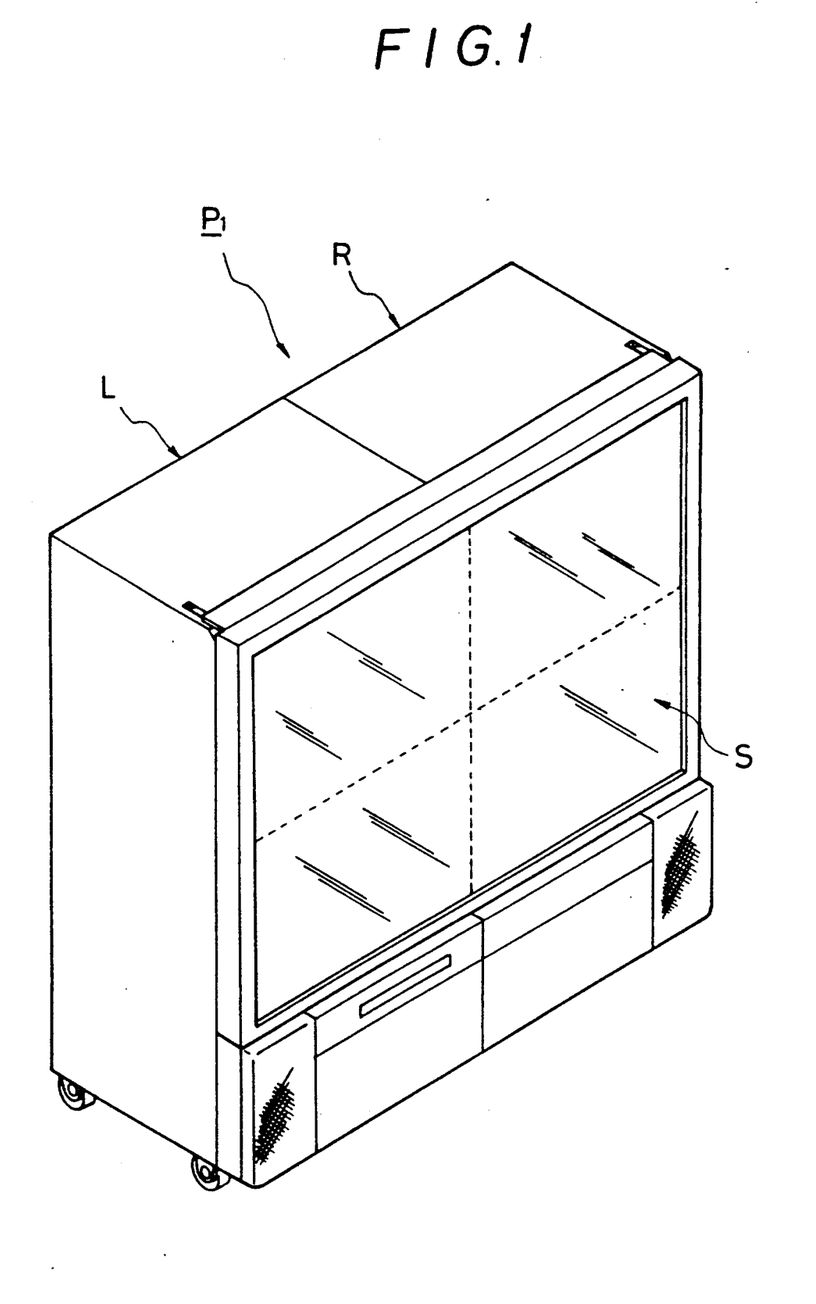
FIG. 1 is a perspective view showing a projection television set according to the invention.
Figure 2:
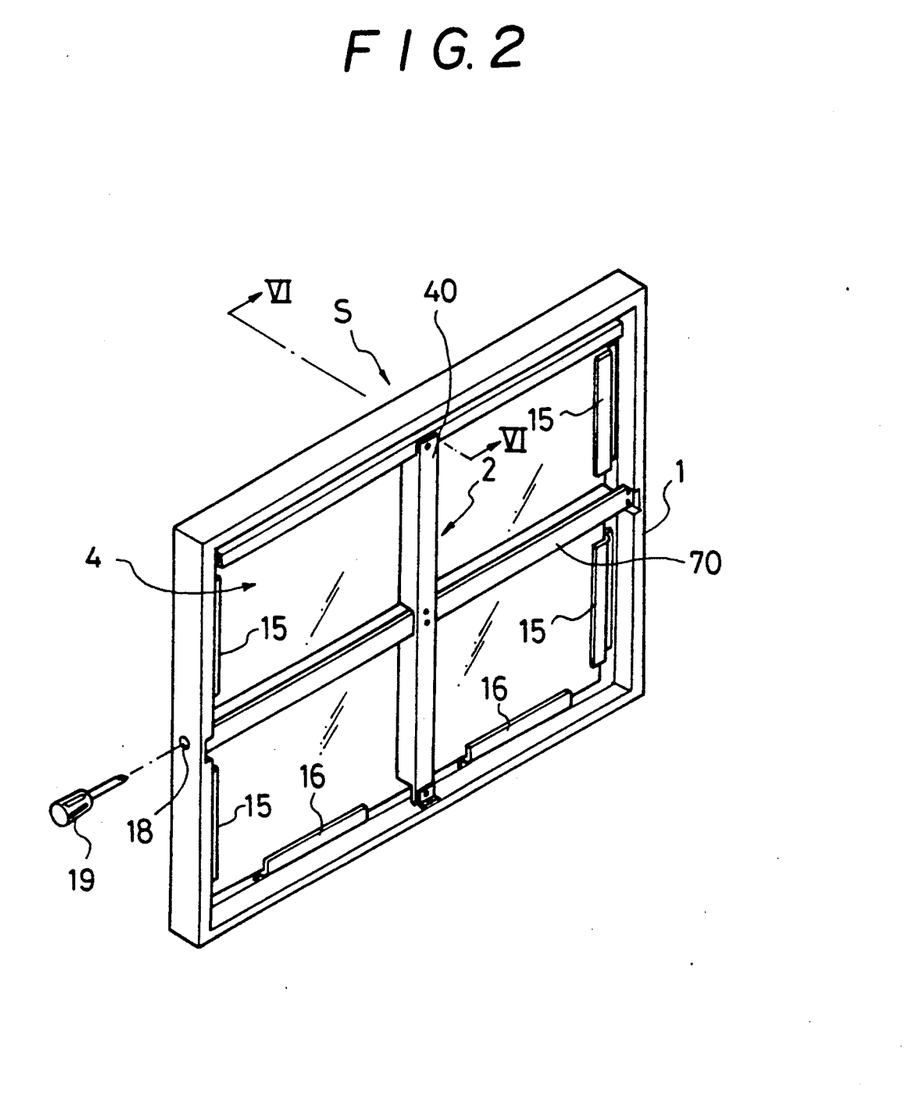
FIG. 2 is a perspective view showing a screen assembly used in the projection television set according to the invention.
Figure 3:
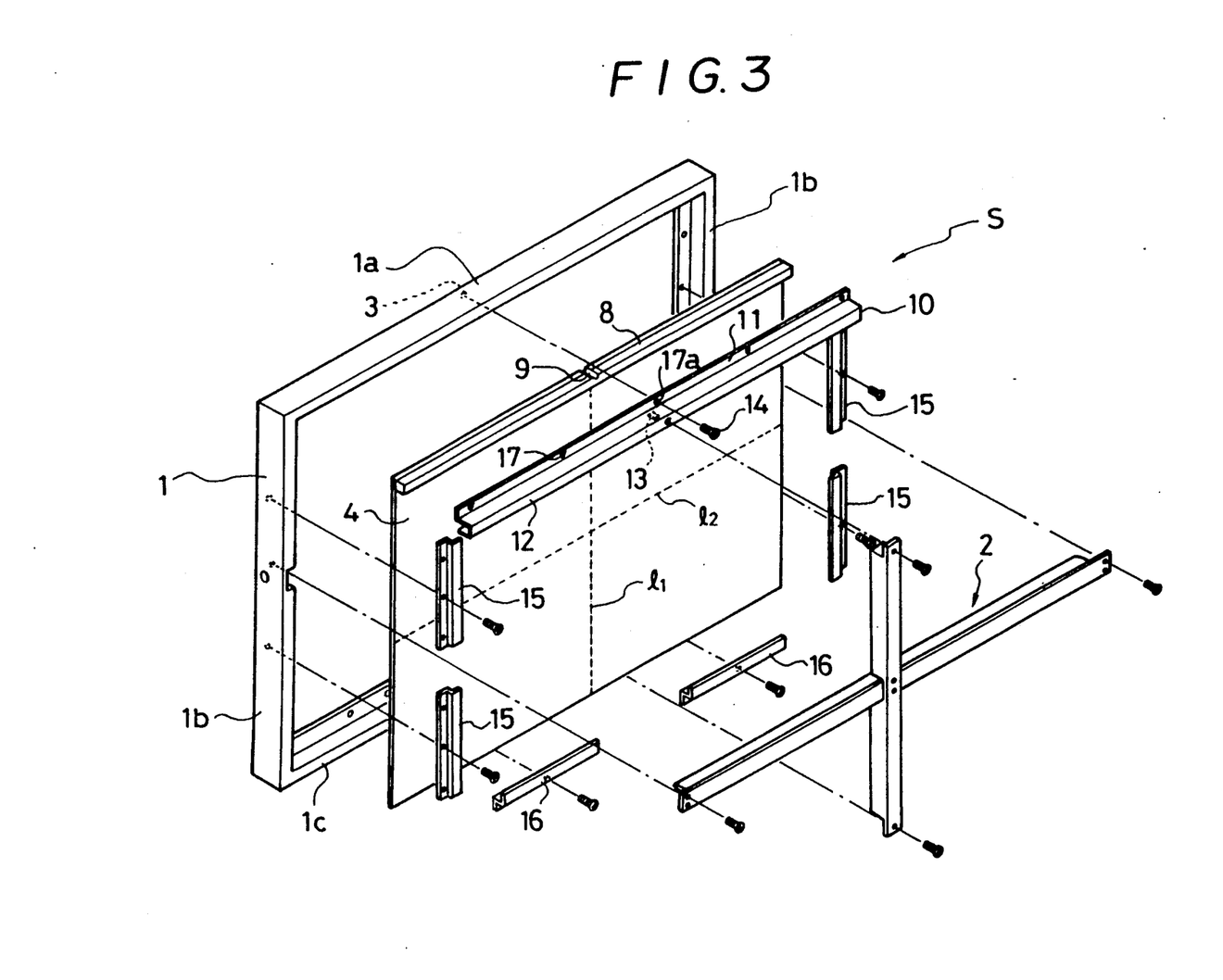
FIG. 3 is an exploded perspective view showing the screen assembly.
Figure 4:
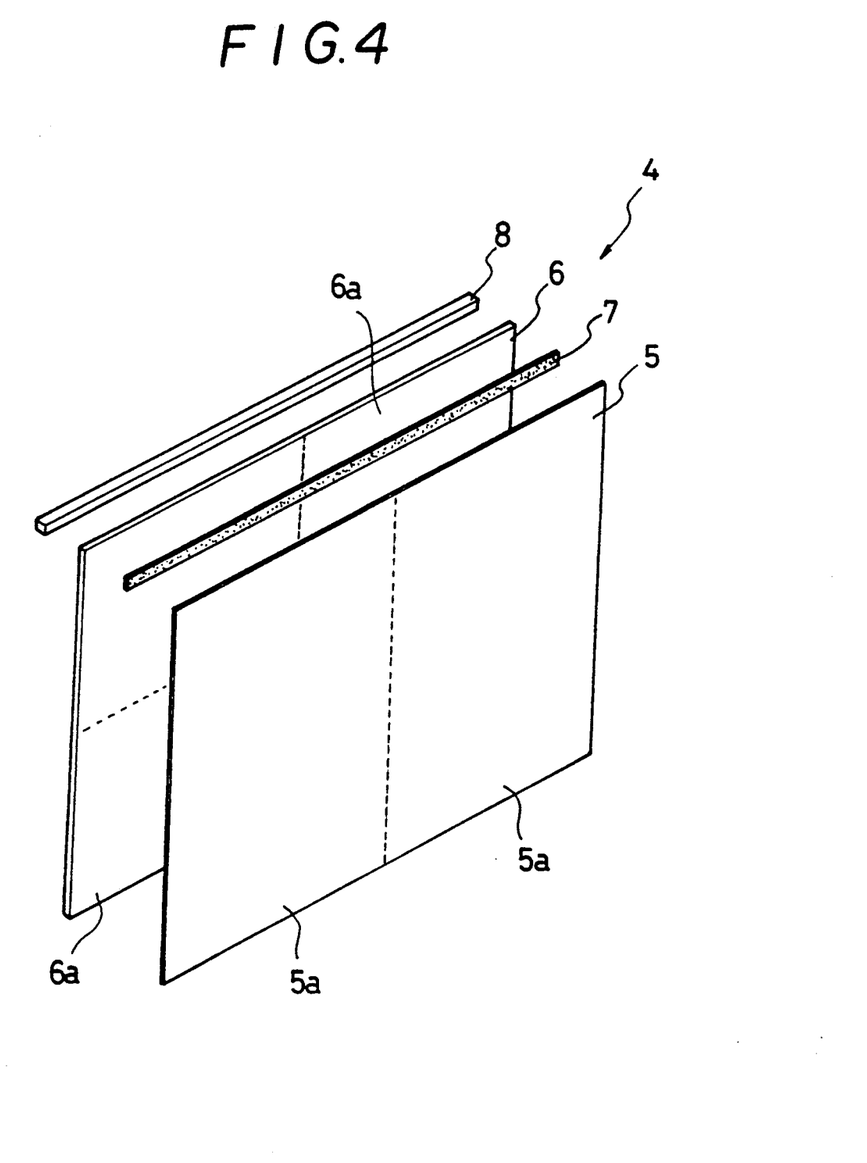
FIG. 4 is an exploded perspective view showing the screen.

In FIGS. 1 and 2, a projection television set $P_1$ according to the present invention has four projectors by way of example. The television set is composed of independent right and left divided units R and L. A screen assembly S is mounted on a front face of the right and left divided units R and L which have been joined together and each of which has two projectors. The screen assembly S is provided with a frame 1 within which suspended and supported is a screen 4 formed by bonding a joined lenticular sheet 5 formed of right and left lenticular sheet 5a, 5a through both-sided adhesive tape 7 to a joined Fresnel lens plate 6 formed of four rectangular circular Fresnel lenses 6a, 6a, . . . , 6a as shown in FIG. 4. As shown in FIGS. 2 and 3, a cruciform black light-shield frame 2 is mounted on a rear side of the screen 4. The cruciform shield frame 2 divides the screen 4 into four sections. Four CRT units are provided corresponding to the four sections. The shield frame 2 is adapted to interrupt the upper, lower, right and left projecting light rays from the CRT units so that the projecting light rays are not intersected or overlapped with each other. If projecting light rays from another CRT unit would be projected onto an unintentional Fresnel lens, the rays would transmit a part just opposite to an intentional part, resulting in formation of a black line on the image.

As shown in FIG. 3, a positioning hole 3 is formed as a second centering section at a center in the right and left direction of an upper side 1a of the screen assembly. A support bar 8 formed by an acrylic rod is attached on an upper side of the screen 4 as a screen support member. A center recess 9 is provided at a center of the support bar 8 in its longitudinal direction. The center recess 9 as a first engagement section corresponds to a joint line $l_1$ for the right and left sections of the screen 4. On the other hand, a screen suspension plate 10 which is composed of a vertical plate 11 and a cover plate 12 formed integrally with the vertical plate 11 with a U-shaped cross section is engaged with the support bar 8. Screw holes 17, 17, . . . , 17 are formed at a predetermined interval in the vertical plate 11. Screws 14 are inserted into these screw holes and are fixed to the inner surface of the upper side 1a of the frame 1 for the screen assembly. In particular, the screw hole 17a, as a first centering section, of the above-described screw holes 17, located at the center of the vertical plate 11, is aligned with the positioning hole 3, as a second centering section, of the frame 1. A center projection 13 is formed as a second center engagement section at a center of the upper surface of the cover plate 12 and at a position corresponding to the center screw hole 17a and is engaged with the center recess 9 of the above-described support bar 8.

Figure 6:
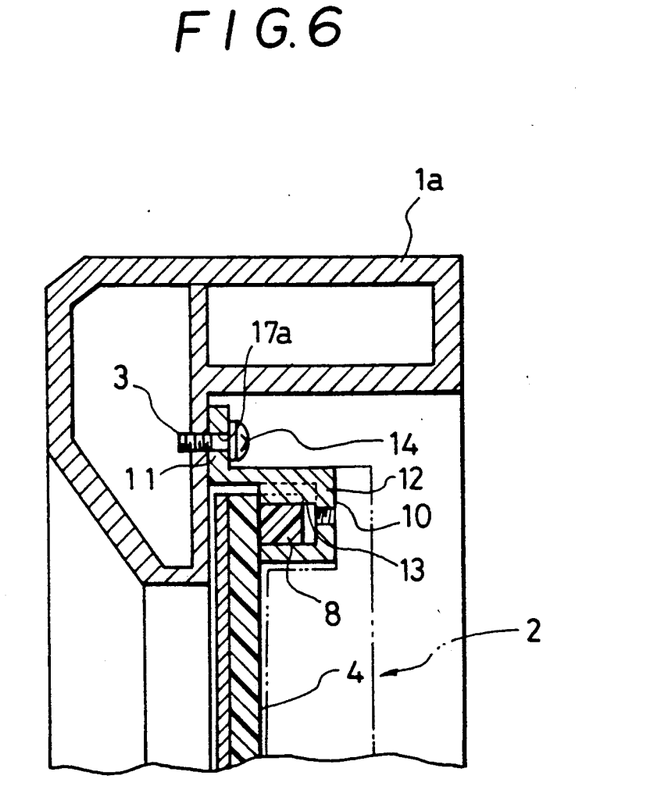
FIG. 6 is a cross-sectional view showing a fixed state of the screen to the frame.

FIG. 6 shows a mount state of the screen 4 onto the frame 1. The projection 13 of the screen suspension plate 10 is engaged with the center recess 9 of the support bar 8 so that the relative position between the support bar 8 and the screen suspension plate 10 is determined. At the same time, the center screw hole 17a is aligned with the positioning hole 3 of the upper side 1a of the frame 1 by the screw 14 so that a relative position between the screen suspension plate 10 and the frame 1 is determined. Thus, the right and left joint line $l_1$ is positioned at a position corresponding to the positioning hole 3 of the frame 1.

Referring again to FIG. 3, planar vertical screen retainers 15, 15, . . . , 15 are fixed to inner surfaces of side plates 1b, 1b of the frame 1. Also, horizontal screen retainers 16, 16 are provided on both right and left sides of a lower side 1c of the frame 1. Both the screen retainers 15 are adapted to support the screen 4 with gaps such that, even if the lateral dimension of the screen 4 would be increased due to its temperature elevation, its expansion may be absorbed or cancelled. In the same way, the horizontal screen retainers 16 are adapted to support the support screen 4 with gaps such that they can absorb or cancel a vertical extension of the screen due to the temperature elevation (see FIG. 5).

Figure 5:
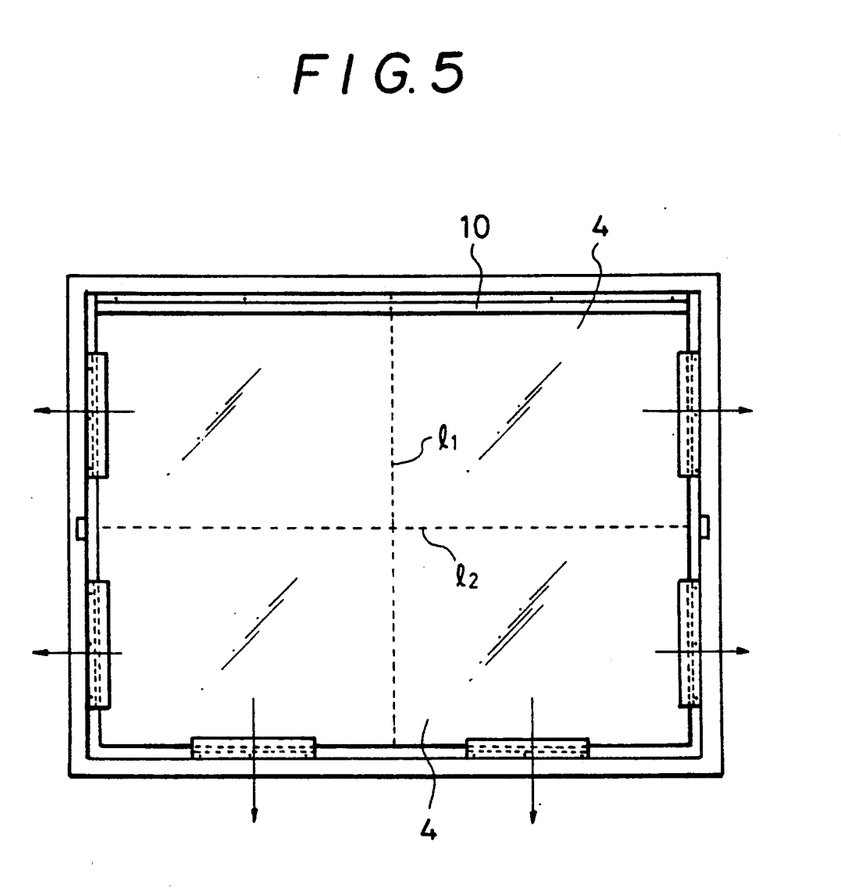
FIG. 5 is a view illustrating the expansion/retraction state of the screen.

Incidentally, although the screen 4 is expanded or contracted due to temperature change or non-uniformity of the machining precision as shown in FIG. 5, if the right and left joint line $l_1$ is aligned with the center of the frame 1 as proposed by the present invention, then the right and left center joint line $l_1$ will not move due to changes in temperature and humidity. Nevertheless, the horizontal joint line $l_2$, is subject to non-uniformity due to the machining precision for every article and is likely to move up and down due to the changes in temperature and humidity.

Figure 9:
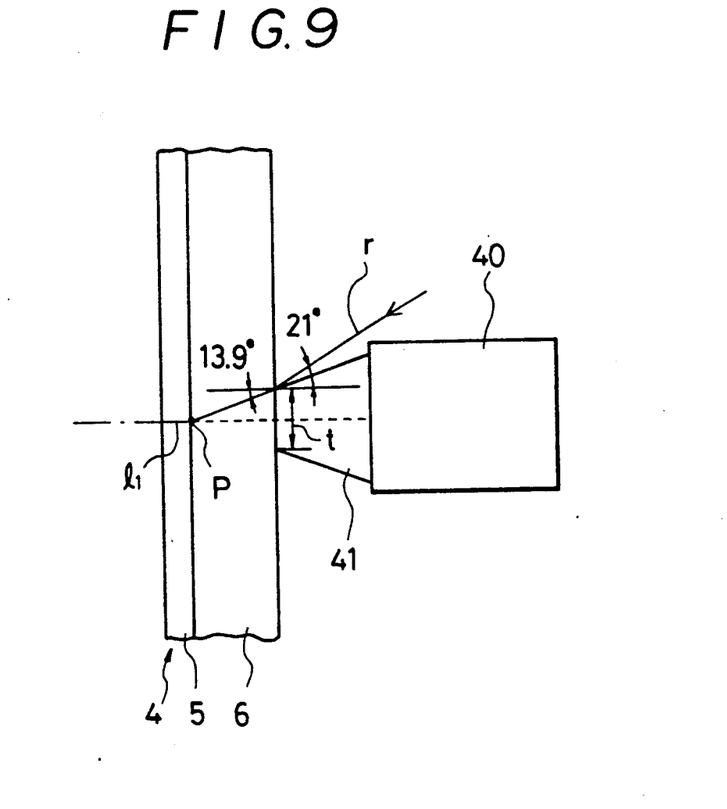
FIG. 9 is a view illustrating a theory of avoiding the image overlap.

Referring now to FIG. 9, in order to avoid the overlap of the light rays projected from the right and left CRT units, it is sufficient to interrupt the rays of light which are closer to the right and left joint line $l_1$ than a ray r reaching a point P on the right and left joint line $l_1$ and which rays pass through an interface between the lenticular sheet 5 and the Fresnel lens 6 of the screen 4. If the right and left joint line $l_1$ is centered without fail, the joint line $l_1$ will not move in the right and left direction due to the changes in temperature and humidity. Accordingly, a light-shielding member 41 is mounted on a front face of a vertical frame 40 of the light-shielding frame 2. Thus, the overlap or interference of light rays projected from the right and left CRT units is prevented. A thickness t of a tip end of the light-shielding member 41 is, for example, approximately 1.5 mm depending upon the projection angle of the CRT units, the thickness of the Fresnel lens and the like.

Figure 7:
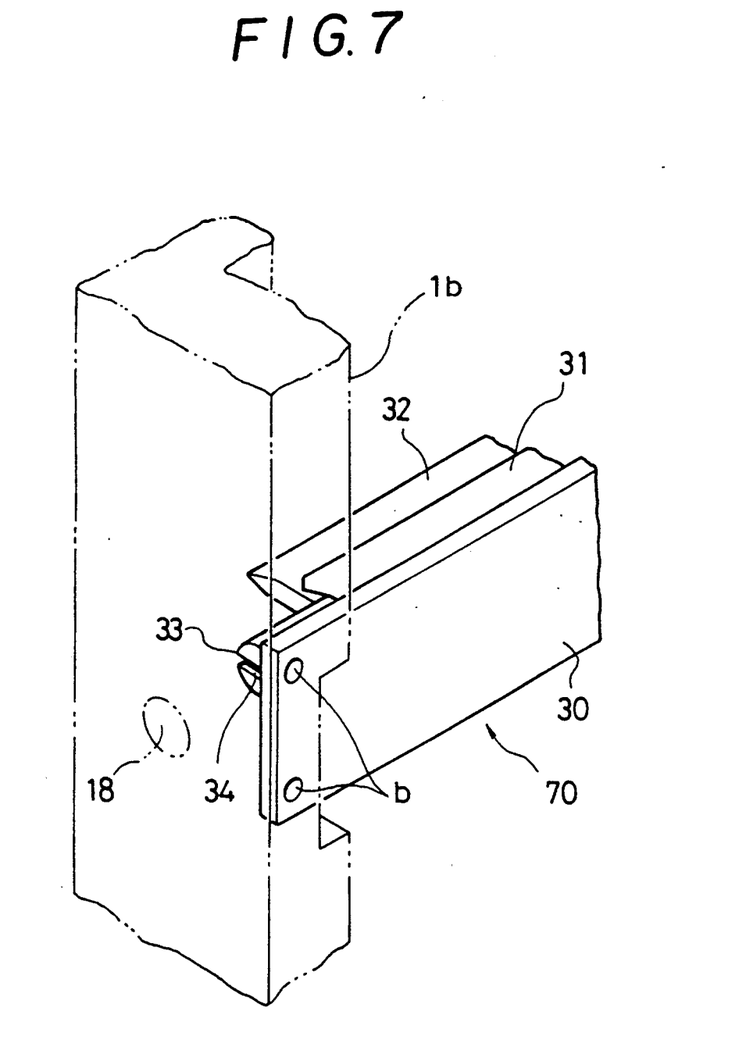
FIG. 7 is a perspective view showing a primary part of the horizontal frame.
Figure 8:
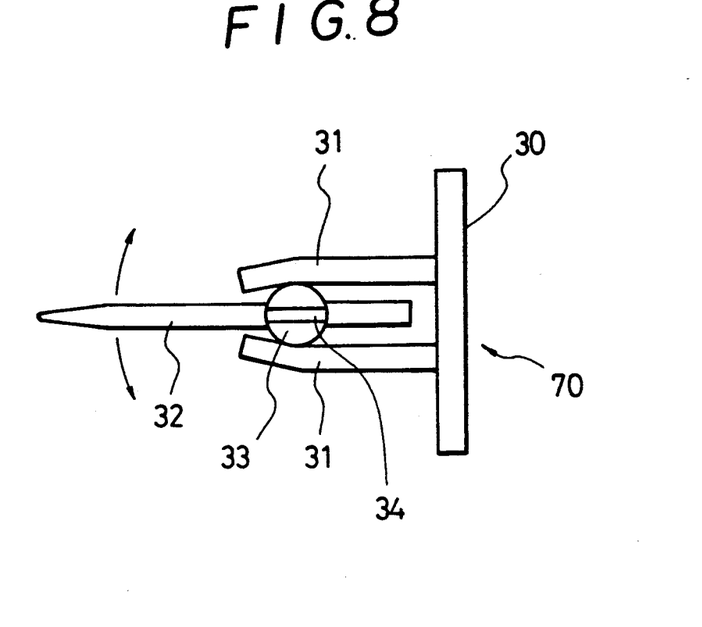
FIG. 8 is a side elevational view showing the horizontal frame.

As shown in FIG. 5, since the horizontal joint line $l_2$ of the screen 4 is displaced vertically due to the changes in temperature and humidity, it is necessary to move a light-shield plate 32 of the horizontal frame 70 in correspondence with the expansion/retraction of the screen 4 (see FIGS. 7 and 8). The horizontal frame 70 has a back plate 30. Screw holes b are formed in ends of the back plate 30. The horizontal frame 70 is fixed to side frames 1b by screws (not shown) which is engaged with the screw holes b. Elastic retainer plates 31, 31 are provided in the back plate 30 at a vertical interval. The light-shield plate 32 which is colored black for the purpose of preventing the reflection of projecting light is rotatably retained between the retainer plates 31. The light-shield plate 32 can prevent the overlap of the light rays projected from the upper and lower projectors in the same manner shown in FIG. 9. That is, path of light rays is set so that light rays are separated upward, downward, left and right at the front face of the Frenel lense (see FIG. 9) to prevent overlap of light rays in the lenticular sheet 5. A rotary bar 33 is provided onto the light-shielding plate 32. Both ends of the rotary bar 33 extend into the side frames 1b. Grooves 34 are formed in both the end faces of the rotary bar 33. On the other hand, screw holes 18 are formed on both the side frames 1b. The rotary bar 33 is inserted into the screw holes 18. For instance, it is possible to change the position of the tip end of the light-shield plate 32 by engaging a driver 19 (see FIG. 2) with the groove 34 of the rotary bar 33 to rotate the rotary bar 33. Thus, the position of the horizontal joint line is different depending upon the machining precision for every article, and the horizontal joint line $l_2$ is moved depending upon the expansion/retraction of the screen 4. However, the position of the light-shielding plate 32 may be adjusted in response to the displacement, thereby interrupting the projection light rays from the other CRT and providing the seamless screen 4.

Figure 10:
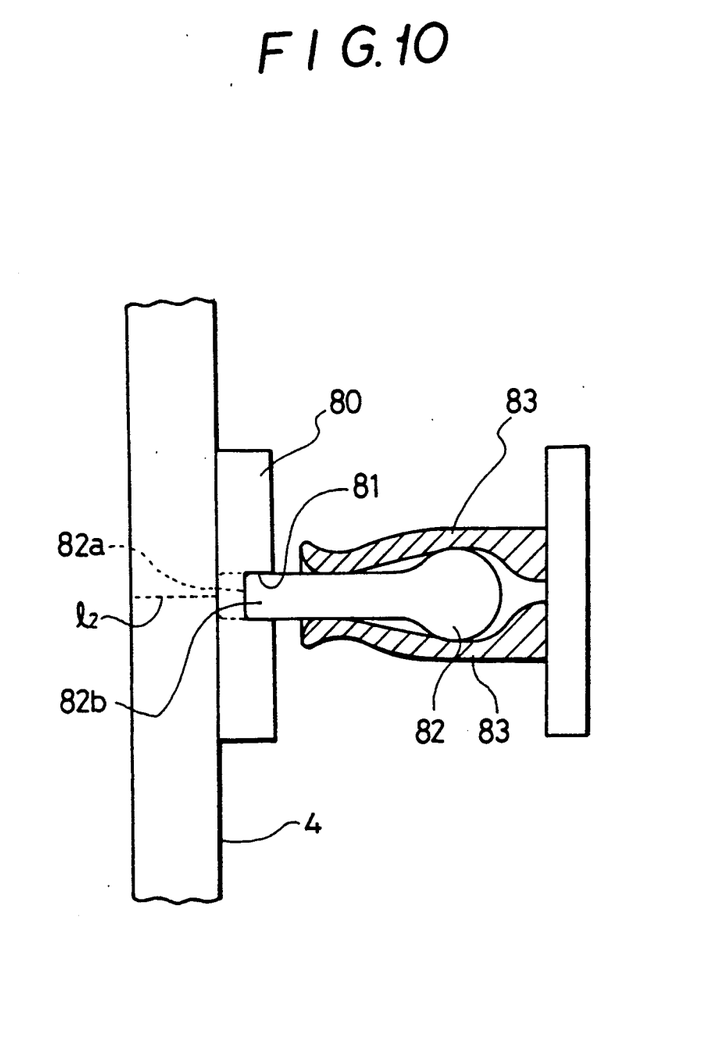
FIG. 10 is a view illustrating a horizontal light-shield frame portion in accordance with another embodiment.

Incidentally, in the foregoing embodiment, the shield plate 32 of the horizontal frame 70 is adjusted by the driver 19 from the outside. However, as shown in FIG. 10, support plates 80 may be provided at both right and left ends of the back side of the screen 4. Recess 81 are formed in the support plates and is rendered to correspond to the horizontal joint line $l_2$. Engagement portion 82b of the light-shield plate 82 are engaged with the recesses 81. A base edge portion of the light-shielding plate 82 is held rotatably with the retainer plates 83. In the case where the horizontal joint line 12 is changed up and down by the temperature and humidity changes, the light-shield plate 82 will rotate automatically in response to the expansion/retraction of the screen 4. An end 82a of the light-shield plate 82 always takes a position in alignment with the horizontal joint line $l_2$. Also, the seamless projection television set has been described in accordance with an example having four projectors. However, the seamless structure may be applied to a television set having a large number of multiple projectors as well as the corresponding number of Fresnel lenses. Furthermore, the projectors may be CRT units or otherwise LCD units. Dimensions of the light-shield plate and the light-shield frame depend upon a projection angle of the projector and may be regarded as a matter of design choice.

With such an arrangement according to the present invention, since the position of the shield plate is adjusted to move from a predetermined position in correspondence with the horizontal joint of the upper and lower portions of the screen due to the non-uniformity in temperature, humidity or machining precision, it is possible to obtain the seamless image.

On the other hand, according to the present invention, it is possible to correctly align the joint line for the right and left joint of the screen with the center of the frame, to avoid the displacement of the joint line from displacing rightwardly and leftwardly due to the change in temperature and humidity, to avoid the entrainment of the projection light rays from the CRT units corresponding to the adjacent unity screen, and to provide a seamless image.

Figure 11:
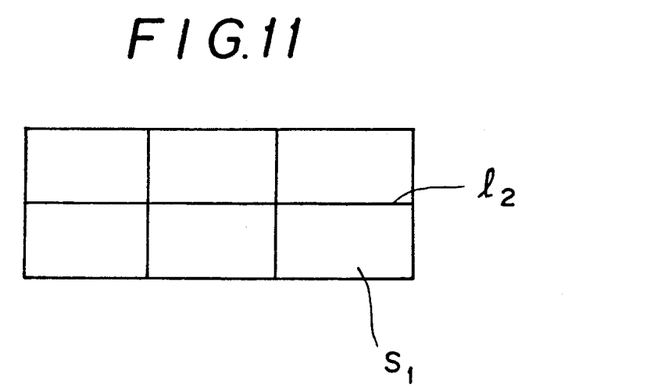
FIG. 11 is a view showing another embodiment.
Figure 12:
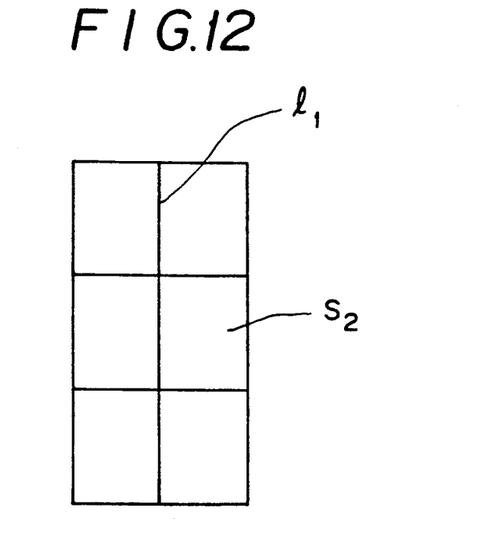
FIG. 12 is a view slowing still another embodiment.

Furthermore, as shown in FIGS. 11 and 12, this invention can be adapted to two screen $S_1$ and $S_2$ including 6 and more than 6 projectors.

In case of FIG. 11, the horizontal joint line $l_2$ can be easily centered on a frame while in case of FIG. 12, the vertical joint line $l_1$ can be easily centered on a frame.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A projection television set comprising:
 a body casing having a front face; and
 a screen assembly provided at the front face of said body casing, said screen assembly including a screen composed of at least two right-and-left divided Fresnel lenses joined together and a lenticular sheet, a frame for defining a periphery of said screen, a screen support member mounted along an upper edge of said screen, and a screen suspension member engaged with said screen support member for supporting said screen to said frame, wherein a first center engagement section is formed at a position of the screen support member corresponding to a joint line for right and left parts of the screen; a second center engagement section of said screen suspension member is engaged with said first center engagement section of said screen support member; and a first centering section of the screen support member formed corresponding to said second center engagement section of said screen suspension member is in alignment with a second centering section formed in an upper central side of said frame.

2. The projection television set of claim 1, wherein said first center engagement section includes a recess formed in said screen support member.

3. The projection television set of claim 2, wherein said second center engagement section includes a projection formed on said screen suspension member.

4. The projection television set of claim 1, wherein said first centering section includes a screw hole formed in said screen suspension member.

5. The projection television set of claim 4, wherein said second centering section includes a screw hole formed in said frame.

6. A projection television set comprising:
 a body casing having a front face; and
 a screen assembly provided at the front face of said body casing, said screen assembly including a joint screen having at least a vertical joint line, a frame for defining a periphery of said joint screen, a cruciform light-shielding frame mounted on the screen, said light-shielding frame having a horizontal light-shielding frame member having a light-shielding plate, and a light-shielding plate adjusting means for adjusting a position of said light-shielding plate;
 wherein said joint screen of the screen assembly is supported under a suspended condition to said frame of the screen assembly while centering the vertical joint line with a center of said frame; and said light-shielding plate is adjustably mounted on at least the horizontal light-shielding frame of the light-shielding frame so that the light-shielding plate is in alignment with the joint line of the screen.

7. The projection television set of claim 6, wherein said light shielding plate adjusting means includes a pair of holding members for rotatably holding said light-shielding plate through a rotary bar, said rotary bar being manually adjustable.

8. The projection television set of claim 6, wherein said light-shielding plate adjusting means includes a pair of holding members for rotatably holding said light-shielding plate and said screen assembly further includes a support plate attached to said screen, said light-shielding plate being coupled with said support plate whereby vertical expansion may be absorbed by said light-shielding plate adjusting means.

9. A projection television set comprising:
 a body casing having a front face; and
 a screen assembly provided at the front face of said body casing, said screen assembly including a screen composed of at least two right-and-left divided Fresnel lenses joined together and a lenticular sheet, a frame for defining a periphery of said screen, a screen support member mounted along an upper edge of said screen, a screen suspension member engaged with said screen support member for supporting said screen to said frame, a cruciform light-shielding frame mounted on the screen, said light-shielding frame having a horizontal light-shielding frame member having a light-shielding plate, and a light-shielding plate adjusting means for adjusting a vertical position of said light-shielding plate independently of its horizontal position; wherein a first center engagement section is formed at a position of the screen support member corresponding to a vertical joint line for right and left parts of the screen; a second center engagement section of said screen suspension member is engaged with said first center engagement section of said screen support member; a first centering section of the screen support member formed corresponding to said second center engagement section of said screen suspension member is in alignment with a second centering section formed in an upper central side of said frame; and said light-shielding plate is adjustably mounted on at least the horizontal light-shielding frame of the light-shielding frame so that the light-shielding plate is in alignment with the horizontal joint line of the screen.

10. The projection television set of claim 9, wherein said first center engagement section includes a recess formed in said screen support member.

11. The projection television set of claim 10, wherein said second center engagement section includes a projection formed on said screen suspension member.

12. The projection television set of claim 9, wherein said first centering section includes a screw hole formed in said screen suspension member.

13. The projection television set of claim 12, wherein said second centering section includes a screw hole formed in said frame.

14. The projection television set of claim 9, wherein said light shielding plate adjusting means includes a pair of holding members for rotatably holding said light-shielding plate through a rotary bar, said rotary bar being manually adjustable.

15. The projection television set of claim 9, wherein said light-shielding plate adjusting means includes a pair of holding members for rotatably holding said light-shielding plate and said screen assembly further includes a support plate attached to said screen, said light-shielding plate being coupled with said support plate whereby vertical expansion may be absorbed by said light-shielding plate adjusting means.

* * * * *